United States Patent [19]

Kleewein et al.

[11] Patent Number: 5,953,719

[45] Date of Patent: Sep. 14, 1999

[54] HETEROGENEOUS DATABASE SYSTEM WITH DYNAMIC COMMIT PROCEDURE CONTROL

[75] Inventors: James Charles Kleewein; Tony Kuen Lee; Shivakumar Venkataraman, all of San Jose; Steven John Watts, Morgan Hill, all of Calif.

[73] Assignee: International Business Machines Corporation, Armonk, N.Y.

[21] Appl. No.: 08/931,029

[22] Filed: Sep. 15, 1997

[51] Int. Cl.$^6$ .................................................. G06F 9/00
[52] U.S. Cl. ................................................. 707/8; 707/10
[58] Field of Search ......................................... 707/1–205

[56] References Cited

U.S. PATENT DOCUMENTS

| | | | |
|---|---|---|---|
| 4,714,995 | 12/1987 | Materna | 707/201 |
| 5,140,689 | 8/1992 | Kobayashi . | |
| 5,165,031 | 11/1992 | Pruul et al. . | |
| 5,212,788 | 5/1993 | Lomet et al. . | |
| 5,241,675 | 8/1993 | Sheth et al. . | |
| 5,276,876 | 1/1994 | Coleman et al. . | |
| 5,428,771 | 6/1995 | Daniels et al. . | |
| 5,428,782 | 6/1995 | White . | |
| 5,452,445 | 9/1995 | Hallmark et al. . | |
| 5,546,582 | 8/1996 | Brockmeyer et al. . | |
| 5,550,982 | 8/1996 | Long et al. | 395/200.13 |
| 5,561,797 | 10/1996 | Gilles et al. . | |
| 5,696,961 | 12/1997 | Briscoe et al. | 395/602 |
| 5,822,780 | 10/1998 | Schutzman | 711/165 |
| 5,835,770 | 11/1998 | Shum et al. | 395/704 |

OTHER PUBLICATIONS

IBM Technical Disclosure Bulletin, vol. 31, No. 5, Oct. 1988, pp. 301–303, "Interpretive Database Merge Join Operation".

IBM Technical Disclosure Bulletin, vol. 24–No. 2, Jul. 1981, pp. 1025–1026, J. W. Mehl, "Two–Phase Commit Protocol for Distributed Communication Systems".

IBM Technical Disclosure Bulletin, vol. 35–No. 2, Jul. 1992, pp. 233–239, "Architecture for High Performance Transparent Bridges".

IBM Technical Disclosure Bulletin, vol. 39–No. 02, Feb. 1996, pp. 235–236, "Use of Structured Query Language Packages for Supporting Extended Dynamic Structured Query Language".

IBM Technical Disclosure Bulletin, vol. 40–No. 2, Feb. 1997, pp. 199–204, "Optimizing Use of Local Coordinators in Distributed Applications".

Sigmod Record, vol. 23–No. 2, Jun. 1994, p. 468, D. Dietterich, "DEC™Data Distributor: for Data Replication and Data Warehousing".

*Primary Examiner*—Paul R. Lintz
*Assistant Examiner*—John G. Mills, III
*Attorney, Agent, or Firm*—Ohlandt, Greeley, Ruggiero & Perle

[57] ABSTRACT

In a distributed database system, at least one of the databases operates as a transaction manager and provides transparent commit coordination between an application program and other connected databases. The transaction manager incorporates a commit alteration procedure which enables selection of either a single phase commit protocol or a two phase commit protocol with respect to each database, during operation of the distributed system. The transaction manager establishes a commit protocol for each connected database; responds to a command from an application program by overriding a commit protocol previously established for a selected database and establishes another commit protocol for the selected database; performs a transaction and utilizes the another commit protocol in connection with the transaction; and upon completion of the transaction as evidenced by a successful commit action, enables establishment of another commit protocol.

16 Claims, 3 Drawing Sheets

HETEROGENEOUS DATABASE SYSTEM WITH DYNAMIC COMMIT PROCEDURE CONTROL

CROSS-REFERENCE TO RELATED PATENT APPLICATIONS

This Application is related to the following co-pending patent applications:

"HETEROGENEOUS DATABASE SYSTEM WITH DATA SOURCE EXTENSIBILITY", Inventor(s): Kleewein et al., U.S. Ser. No. 08/929,809;

"SYSTEM AND METHOD FOR PROVIDING A SINGLE APPLICATION PROGRAM INTERFACE FOR HETEROGENEOUS DATABASES", Inventor(s): Kleewein et al., U.S. Ser. No. 08/931,008;

"METHOD AND APPARATUS FOR OPTIMIZING QUERIES ACROSS HETEROGENEOUS DATABASES", Inventor(s): Kleewein et al., U.S. Ser. No. 08/929,877;

"METHOD AND APPARATUS FOR OPTIMIZING A MERGE-JOIN OPERATION ACROSS HETEROGENEOUS DATABASES", Inventor(s): Kleewein et al., U.S. Ser. No. 08/931,404;

"METHOD AND APPARATUS FOR CACHING RESULT SETS FROM QUERIES TO A REMOTE DATABASE IN A HETEROGENEOUS DATABASE SYSTEM", Inventor(s): Kleewein et al., U.S. Ser. No. 08/931,003;

"METHOD AND APPARATUS FOR DEFERRING LARGE OBJECT RETRIEVALS FROM A REMOTE DATABASE IN A HETEROGENEOUS DATABASE SYSTEM", Inventor(s): Kleewein et al., U.S. Ser. No. 08/929,642; and "METHOD AND APPARATUS FOR ACCESSING OF LARGE OBJECT DATA SEGMENTS FROM A REMOTE DATABASE", Inventor(s): Maheshwari et al., U.S. Ser. No. 08/931,002.

FIELD OF THE INVENTION

This invention relates to distributed, heterogeneous database systems and, more particularly, to a heterogeneous database system which enables one database management system (DBMS) to act as a transparent interface for all connected database systems and further enables dynamic control of commit procedures that are utilized during operation of the database systems.

BACKGROUND OF THE INVENTION

Database systems carry out their functions through the use of discrete transactions A transaction is a unit of work which includes an execution of an application programspecified sequence of operations that are initiated with a begin transaction operation, include one or more update and/or read access operations, and end with either a commit or backout operation. A commit operation signals successful completion of the transaction, while a backout operation denotes unsuccessful completion of the transaction due to an abnormal circumstance. The commit and backout operations are employed to ensure that transactions proceed atomically, or not at all.

In a transaction-oriented system wherein operations are executed at only one site during any transaction, transaction atomicity is enforced by a one-phase synchronization operation, known as a "single phase commit". A single phase commit operation proceeds as follows. When a transaction is completed, the DBMS requests that the site where the transaction occurred make permanent all changes to the database made during the transaction. In response, the site either commits or backs out the changes and reports the commit or backout actions to the DBMS.

In distributed database systems, a transaction may cause changes to databases at more than one site. In such a system, atomicity can be guaranteed only if all of the sites agree on its outcome. Many such systems use a transaction synchronization procedure called "two phase commit" wherein, in a first phase of the protocol, all involved database sites are requested to prepare to commit. In response, the sites individually decide whether to commit or backout their operations. Those decisions are communicated to a synchronization site where the "votes" are counted. If all sites vote to commit, a request to commit is issued to all sites, in response to which, all of the sites commit their operations. If any one site votes to back out its operation, all sites back out their operation.

A two phase commit, while enabling synchronization of multiple databases, requires more communication and processing than a single phase commit and thus is more costly in terms of system processing time. By contrast, a single phase commit is faster, requires less processing bandwidth, but is limited in its ability to assure data synchronization in a distributed database system. Nevertheless, even in a distributed database system, some data access operations are such that a single phase commit is sufficient to assure data synchronization, e.g., read-only actions which require no write actions; where only a single database site requires synchronization, etc. Accordingly, in those cases a single phase commit protocol is sufficient to assure data integrity.

For a database which can support both single phase and two phase commit protocols, it would thus be useful to enable an application program to adaptively control which type of commit protocol is used, in accordance with the particular data access action being performed. In the prior art, commit protocols have generally been set during an initialization phase between a central database site and remote database sites. Thereafter, the commit protocol has remained unchanged.

Accordingly, it is an object of this invention to provide a distributed database system with an improved ability to selectively alter commit protocols.

It is another object of this invention to provide an improved distributed database system which can transition between single phase and two phase commits, based upon the data access procedure that is executed.

SUMMARY OF THE INVENTION

In a distributed database system, at least one of the databases operates as a transaction manager and provides transparent commit coordination between an application program and other connected databases. The transaction manager incorporates a commit alteration procedure which enables selection of either a single phase commit protocol or a two phase commit protocol with respect to each database, during operation of the distributed system. The transaction manager performs a method that includes the steps of: establishing a commit protocol for each connected database; responding to a command from an application program by overriding a commit protocol previously established for a selected database and establishing another commit protocol for the selected database; establishing a communication session with the selected database to enable performance of a transaction and utilizing the another commit protocol in connection with the transaction; and upon completion of the transaction as evidenced by a successful commit action, enabling establishment of another commit protocol during continued execution of the application program.

DETAILED DESCRIPTION OF THE INVENTION

As used herein, the term "transparent" implies that an application program is able to access data from all connected databases without being aware of the origin of the data nor of any incompatibilities which might exist between a local database and any of a plurality of remote databases. It is also to be understood that the terms "remote" and "local" not only refer to physical locations, but also to databases that are located at a single site (in one or more computers) but are controlled by different operating systems or database protocols. In the latter category, "local" defines a DBMS site where a data query is initiated and "remote" defines the database at a site which is controlled by a different DBMS.

Figure 1:
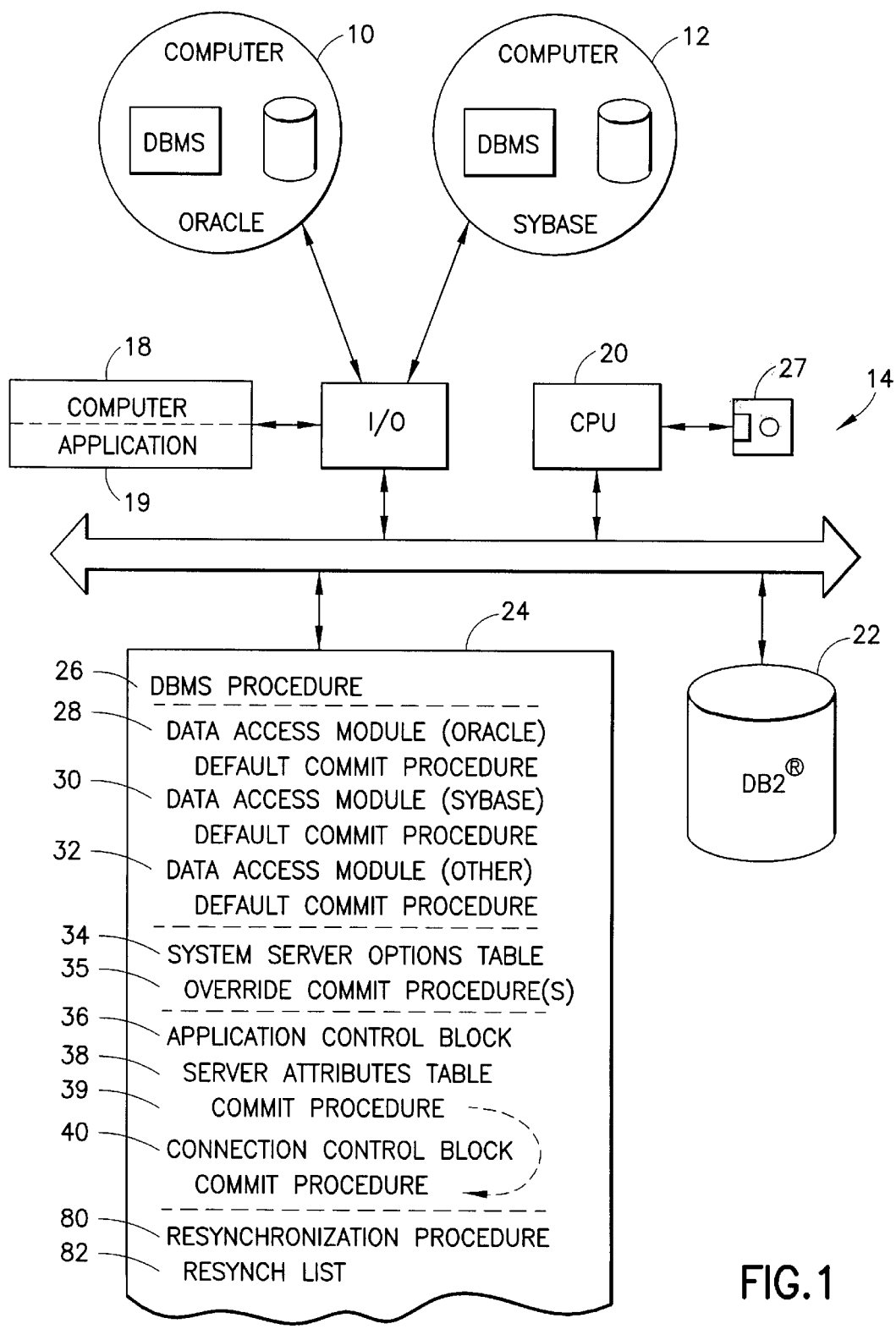
FIG. 1 is a high level block diagram of a heterogeneous database system which provides a transparent application program interface to all databases and enables dynamic alteration of commit protocols.

Referring to FIG. 1, a distributed database system comprises, for example, three separate DBMS's i.e., a computer 10 which includes an Oracle DBMS, a computer 12 which includes a Sybase DBMS, and a computer/server 14 which includes an IBM DB2® DBMS. (Oracle is a trademark of the Oracle Corp., Sybase is a trademark of the Sybase Corp., IBM and DB2 are registered trademarks of the International Business Machines Corp.). Each of the aforesaid databases can be accessed by a standard data access language such as SQL (structured query language). SQL functions as a standard interface language which substantially all databases can understand and respond to.

Since each of computers 10 and 12 includes a remotely located DBMS, each will be hereafter referred to as a remote DBMS. By contrast, the DB2 DBMS employed by computer 14 will hereafter be referred to as a local DBMS. Because computer/server 14 controls database accesses by an application program to and from each of computers 10 and 12, in addition to the local DB2 database, computer/server 14 is also called a "transaction manager". As a transaction manager, computer/server 14 performs an interface function which assures transparent access by an application program to each of the aforesaid databases.

Computer/server 14 includes an input/output (I/O) module 16 which enables communication with computers 10 and 12 and other computers 18, etc. An application program 19 at computer 18 is able to access data from any connected database on a transparent basis, with it appearing as though all data comes from computer/server 14.

Computer/server 14 includes a central processing unit (CPU) 20 and a disk file 22 where the data comprising the DB2 database is stored. A memory 24 includes DBMS procedure 26 which, in conjunction with CPU 20, provides (i) overall control of DB2 database 22 and (ii) interface actions with the Oracle and Sybase databases present on computers 10 and 12, respectively. While DBMS procedure 26 and the subsidiary procedures controlled thereby (to be considered below) are shown as already loaded into memory 24, it is to be understood those procedures can be loaded into CPU 20 via a memory disk, tape or other storage device 27 in the well known manner. In any of these cases, the operation of CPU 20, in carrying out the functions of the invention, are controlled by the procedures and data stored in either memory 24 or storage device 27.

Each database type (such as an Oracle database, a Sybase database, etc.) is accessed by processor/server 14 through use of a data access module (DAM). A DAM is a program which specifies procedures and provides necessary data to enable data transactions to be carried out with a respective database type. A DAM is set up for each database type at system initialization and, once populated with parameters which define the respective database type and access protocols, enables DBMS 26 to communicate with the respective database type. One entry in each DAM is a default commit protocol (i.e. either single phase or two phase) to be utilized with the respective database type.

As shown in FIG. 1, memory 24 includes DAMs 28, 30 and 32 for the respective database types of Oracle, Sybase and "other". A default commit protocol in a DAM controls DBMS procedure 26 in the absence of any overriding instruction. In that regard, processor/server 14 includes a system server options table 34 which stores various user-inserted server options which persist from application to application. System server options table 34 can include an override commit procedure 35 which is senior in precedence and displaces any default procedure contained within a DAM, for the respective database type.

When application program 19 (e.g. running on CPU 18), initially connects to computer/server 14, an application control block (e.g. 36) is created and constitutes a logical data structure that is thereafter used to control communications between application program 19 and computer/server 14. Each application control block includes a server attributes table 38 which stores user-specified server options that are only in effect during the lifetime of the application program connection. Server attributes table 38, in this case, can be set to include a commit procedure 39 by a command from application program 19.

Note that commit procedure 39 present in server attribute table 38 can be altered during the execution time of application program 19. Such an alteration is accomplished by application program 19 issuing a "set server option" command to DBMS 26, which then accordingly alters commit procedure 39 in server attribute table 38. This action causes application control block 36 to be reset to either a single phase or a two phase commit procedure, as the case may be.

Whatever commit procedure 39 is currently present in server attribute table 38 overrides commit procedure 35 (for the respective database) found in system server options table 34 or a default commit procedure found in a DAM for the respective database type.

The first time DBMS 26 accesses a remote database with an application program's request to accomplish a transaction, i.e., a data access, a connection control block 40 is established and DBMS 26 inserts into the connection control block's data structure, the commit procedure 35 found in the corresponding server attribute table 38 (and if none is present therein, the commit procedure found in system server options table 34 or, if none is present, a respective DAM commit procedure entry for the database type). So long as the connection continues, the application program is prevented from issuing a set server option command. Thus, connection control block 40 remains fixed and controls the commit procedure in accordance with its commit procedure entry.

After a transaction with the database commits or rolls back, the commit procedure remains in connection control block 40 in case application program 19 again references the respective database in a subsequent transaction. Nevertheless, application program 19 is enabled to change the commit entry in connection control block 40 by issuing an appropriate command. If the application program thereafter terminates its connection to computer/server 14, connection control block 40 is discarded. This thereby enables application program 19, upon a next access to computer/server 14, to cause creation of a new connection control block 40 with a newly specified commit procedure.

More specifically, each time application program 19 issues a query to computer/server 14, after establishing an initial connection therewith, a new connection control block data structure 40 is created (one does not already exist). If a previous transaction has successfully committed and before a next transaction commences, a "set server option" command may be issued by application program 19 to alter commit procedure 38 in server attributes table 38. Accordingly, the connection control block, when thereafter created, acquires the revised commit procedure for use during a database transaction to be carried out in response to a query. Thus, for example, if a series of read actions are required (without a write action) or a single database is being updated, the application will normally specify a single phase commit to be used by the active database, to enable more rapid and efficient utilization of the data processing resources.

Figure 2:
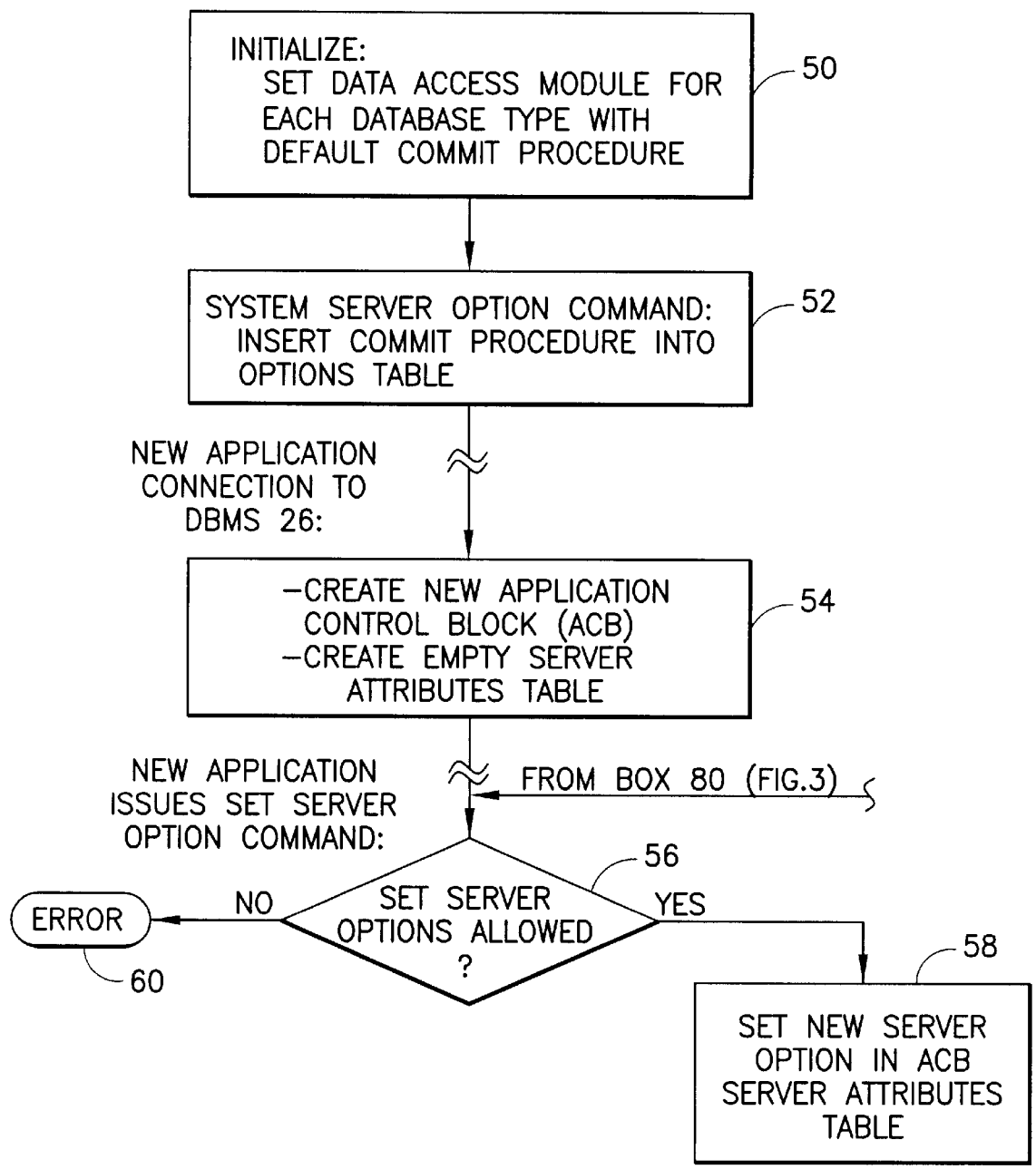
FIGS. 2 and 3 comprise high level flow diagrams which illustrate the procedure employed by the system of FIG. 1, in altering commit protocols at connected databases.

Turning now to FIG. 2, a logical flow diagram illustrates the operation of the invention. At initialization time (box 50), a DAM is established for each remote database type and includes a default commit procedure. Thereafter, if a system server option command is received and designates a commit procedure, such commit procedure is inserted into a server options table and persists to control commit procedures from application to application (if not supplanted by a further user specified commit procedure) (box 52). Because the events illustrated in FIG. 2 will generally occur asynchronously, breaks are noted in the lines connecting the individual boxes in FIG. 2 to indicate an elapse of an indefinite period of time.

Assume that application program 19 opens a new connection to DBMS 26. At such time, DBMS 26 creates both a new application control block (ACB) 36 and an empty server attributes table 38 associated with ACB 36 (box 54). Thereafter, application program 19 is enabled to issue a set server option command which alters a commit procedure to be thereafter used during a data base transaction. Assuming the set server option is allowed (decision box 56), the new commit procedure is entered in the server attributes table 38 that is associated with ACB 36 (box 58). If the set server option is not allowed (e.g., an existing transaction has not committed), an error is generated (bubble 60).

Figure 3:
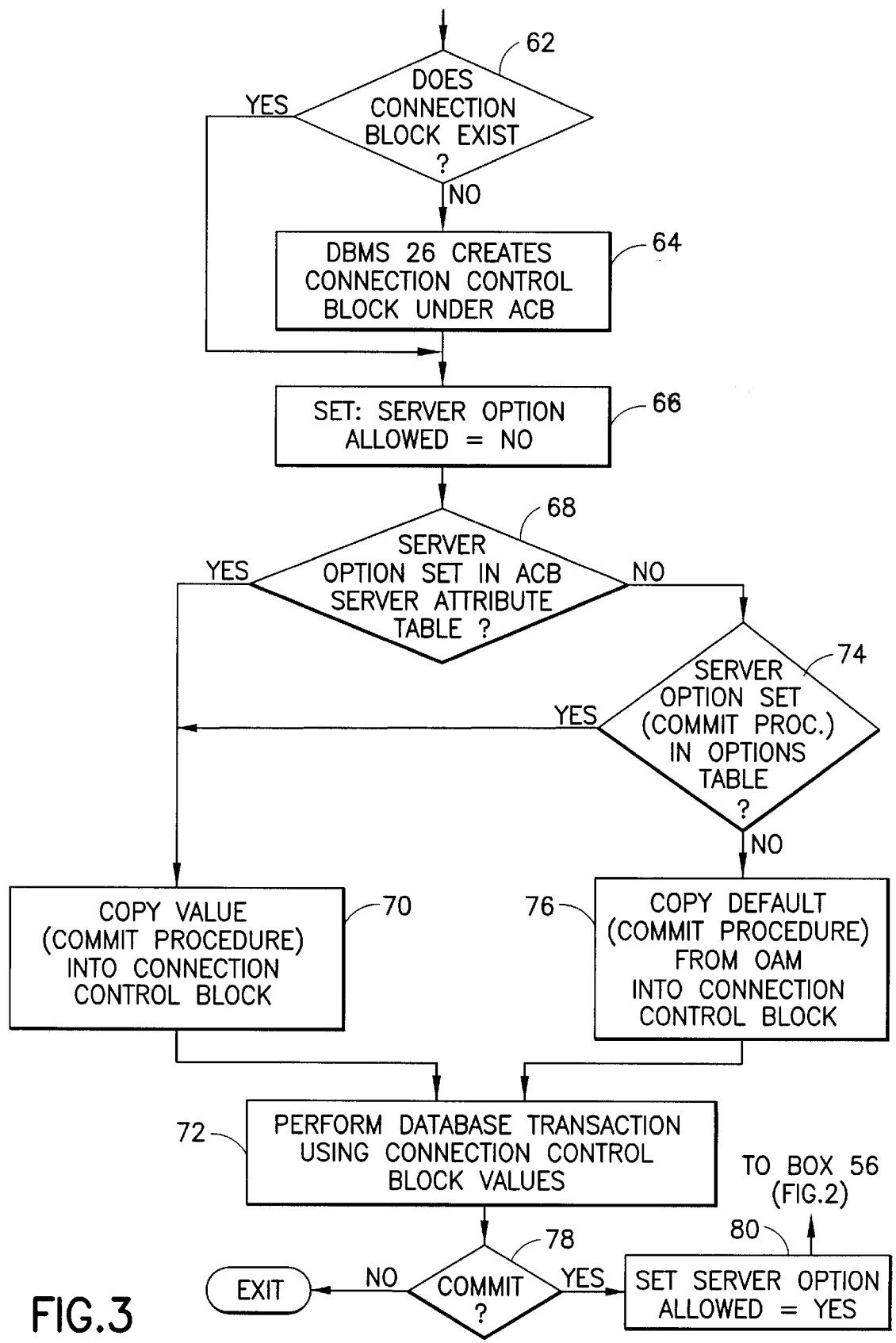

Turning to FIG. 3, assume now that application program 19 issues a query to a remote DBMS. In such case, DBMS 26 first determines if a connection control block 40 already exists (decision box 62). If no, DBMS 26 creates a connection control block 40 under the previously created ACB 36 for application program 19 (box 64). Otherwise, the procedure moves to box 66 where the server option allowed value is set to no, thereby preventing any further changes of the current commit procedure until the current transaction has committed (box 66).

Thereafter, DBMS 26 determines whether the server option is set in server attributes table 38 associated with ACB 36 (decision box 68). If yes, the value indicative of the current commit procedure is copied into connection control block 40 (box 70) and a database transaction is performed using the connection control block values (and the commit procedure indicated thereby) (box 72). By contrast, if the server option is not set in server attribute table 38 (decision box 68), then it is next determined whether the server option is set in system server options table 34. If yes, the value indicative of the commit procedure present in options table 34 is copied into connection control block 40 (box 70) and the database transaction is performed (box 72).

If there is no commit procedure indicated in options table 34, the default commit procedure is copied from the respective data access module into connection control block 40 (box 76) and the database transaction is performed (box 72).

Thereafter, DBMS procedure 26, upon detecting a successful commit of the transaction (decision box 78), resets the "set server option allowed" value to yes (box 80) and the procedure returns to decision box 56 in FIG. 2 and continues. At this point, a further change to the commit procedure is allowed.

Referring now back to FIG. 1, if a failure occurs during a data access, one or more databases may experience a failure of a commit action, requiring a rollback and resynchronizing action to be carried out. If just one database is employed, the resynchronization strategy involves a backing out of all incomplete data actions and a resetting to a point in the procedure just prior to the incomplete transaction. When, however, an application is referring to plural databases, an added level of complexity is added if the databases act differently in response to a commit failure.

Accordingly, DBMS 26 uses a resynch procedure 80 and a resynch list 82 (FIG. 1) which maintains a list of transactions that have completed phase one of a two phase commit but have not successfully completed phase two of the two phase commit. Periodically, resynch procedure 80 goes through resynch list 82 to commit every transaction on the list (and upon accomplishing the resynch, removes the transaction from the resynch list).

DBMS 26 must deal with different commit protocols in a heterogeneous database environment. If a remote database uses a "presumed abort" protocol, then when the remote database finds a transaction is "in doubt", it actively attempts to communicate with the transaction manager to request a decision on the transaction. The transaction manager (i.e., computer/server 14), upon receiving a request for a transaction decision, searches it's resynch list 82 to determine whether such a transaction exists. If the transaction does not exist, the transaction manager responds "rollback," and the remote database performs a rollback. If the transaction is found, the transaction manager responds with a commit decision. This protocol is known as presumed abort and is used in DB2 databases.

For non-DB2 data sources, such as Oracle, a "presumed nothing" protocol is used. In this case, the data source does not communicate with the transaction manager to request a decision on an in doubt transaction. Instead, the transaction manager, upon examination of resynch list 82, must initiate a request that the remote data source to commit any listed transactions during the resynch processing. This protocol is known as presumed nothing. Thus, DBMS procedure 26, is provided with information regarding the resynch protocol used by each database type. Accordingly, DBMS procedure 26, in conjunction with resynch procedure 80, enables use of an appropriate protocol during a resynch procedure, in accordance with the type of remote database involved.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for enabling transparent access by an application program to a plurality of databases, at least one database management system (DBMS) acting as an interface between said application program and other connected databases, said DBMS performing a method comprising the steps of:
   a) establishing a commit protocol for each of said connected databases, wherein each commit protocol signals whether a transaction has successfully completed;
   b) responding to a command from an application program by overriding a commit protocol established in step a) for a selected database and establishing another commit protocol for said selected database;
   c) establishing a communication session with said selected database to enable performance of a transaction and utilizing said another commit protocol in connection with said transaction; and
   d) upon completion of said transaction as evidenced by a successful commit action, enabling establishment of another commit protocol during continued execution of said application program.

2. The method as recited in claim 1, wherein said another commit protocol is a single phase commit protocol to be executed by said DBMS to complete said transaction when said transaction comprises a sequence of read commands issued by said application program.

3. The method as recited in claim 1, wherein said another commit protocol is a single phase commit protocol to be executed by said DBMS to complete said transaction when said transaction comprises an update to only a single involved database.

4. The method as recited in claim 1, wherein said DBMS initially establishes said commit protocol in step a), and wherein step a) further establishes, in response to a command from a processor that is operating under control of said application program, a still further commit protocol which may be the same or different as said initially established commit protocol and is effective during plural applications in lieu of said initially established commit protocol.

5. The method as recited in claim 4, wherein said another commit protocol overrides both said initially established commit protocol and said still further commit protocol.

6. A method for enabling transparent access by an application program to a plurality of databases, at least one database management system (DBMS) acting as an interface between said application program and other connected databases, said DBMS performing a method comprising the steps of:
   a) establishing a commit protocol for each of said connected databases, wherein each commit protocol signals whether a transaction has successfully completed;
   b) responding to a command from an application program by dynamically overriding a commit protocol established in step a) for a selected database and, after a transaction has committed but before a new transaction has commenced, establishing another commit protocol for said selected database for use when said new transaction is performed in connection with said selected database.

7. The method as recited in claim 6, wherein said another commit protocol is a single phase commit protocol to be executed by said DBMS to complete said transaction when said transaction comprises a sequence of read commands issued by said application program.

8. The method as recited in claim 6, wherein said another commit protocol is a single phase commit protocol to be executed by said DBMS to complete said transaction when said transaction comprises an update to only a single involved database.

9. The method as recited in claim 6, wherein said DBMS initially establishes said commit protocol in step a), and wherein step a) further establishes, in response to a command from a processor that is operating under control of said application program, a still further commit protocol which may be the same or different as said initially established commit protocol and is effective during plural applications in lieu of said initially established commit protocol.

10. The method as recited in claim 9, wherein said another commit protocol overrides both said initially established commit protocol and said still further commit protocol.

11. A memory media for enabling a processor to provide transparent access by an application program to a plurality of databases, said processor including a database management system (DBMS) which acts as an interface between said application program and other connected databases, said memory media comprising:
    a) means for controlling said processor to establish a commit protocol for each of said connected databases, wherein each commit protocol signals whether a transaction has successfully completed;
    b) means for controlling said processor to respond to a command from an application program by overriding a commit protocol established by means a) for a selected database and establishing another commit protocol for said selected database;
    c) means for controlling said processor to establish a communication session with said selected database to enable performance of a transaction and to utilize said another commit protocol in connection with said transaction; and
    d) means for controlling said processor to enable establishment of another commit protocol, upon completion of said transaction as evidenced by a successful commit action, during continued execution of said application program.

12. The memory media as recited in claim 11, wherein another commit protocol is a single phase commit protocol to be executed by said DBMS to complete said transaction when said transaction comprises a sequence of read commands issued by said application program.

13. The memory media as recited in claim 11, wherein another commit protocol is a single phase commit protocol to be executed by said DBMS to complete said transaction when said transaction comprises an update to only a single involved database.

14. The memory media as recited in claim 11, wherein means a) causes said DBMS to initially establish said commit protocol, and to further establish, in response to a command from a processor that is operating said application program, a still further commit protocol which may be the same or different as said initially established commit protocol, said still further commit protocol being effective during plural applications, in lieu of said initially established commit protocol.

15. The memory media as recited in claim 11, wherein means c) causes said another commit protocol to override both said initially established commit protocol and said still further commit protocol.

16. A method for enabling resynchronization of data entries in a distributed database system, at least one database management system (DBMS) acting as an interface between an application program and other connected databases, said DBMS performing a resynchronization method comprising the steps of:

a) providing an indication of a resynchronization procedure employed by each type of database included in said distributed database system;

b) detecting an event which requires a resynchronization of data actions in said distributed database system;

c) executing a resynchronization procedure for each distributed database type that requires a resynchronization action, in accord with said indication of resynchronization procedure for each type of database.

* * * * *